(12) United States Patent
Ings (10) Patent No.: US 11,248,631 B2
(45) Date of Patent: Feb. 15, 2022

(54) HYBRID HYDROSTATIC ROTARY ACTUATOR APPARATUS

(71) Applicant: MIRSEE ROBOTICS INC., Cambridge (CA)

(72) Inventor: Robert David Ings, Cambridge (CA)

(73) Assignee: Mirsee Robotics Inc., Cambridge (CA)

( * ) Notice: Subject to any disclaimer, the term of this patent is extended or adjusted under 35 U.S.C. 154(b) by 0 days.

(21) Appl. No.: 17/151,542

(22) Filed: Jan. 18, 2021

(65) Prior Publication Data

US 2021/0140452 A1 May 13, 2021

Related U.S. Application Data

(63) Continuation of application No. 16/298,694, filed on Mar. 11, 2019, now Pat. No. 10,895,271.

(60) Provisional application No. 62/641,213, filed on Mar. 9, 2018.

(51) Int. Cl.

| F15B 15/12 | (2006.01) |
|---|---|
| F15B 15/10 | (2006.01) |
| F15B 11/072 | (2006.01) |
| B25J 13/02 | (2006.01) |
| B25J 9/14 | (2006.01) |

(52) U.S. Cl.
CPC ............ *F15B 11/072* (2013.01); *B25J 9/146* (2013.01); *B25J 13/025* (2013.01); *F15B 15/10* (2013.01); *F15B 15/125* (2013.01); *F15B 2211/20576* (2013.01); *F15B 2211/7058* (2013.01)

(58) Field of Classification Search
CPC ...... F15B 11/072; F15B 15/125; F15B 15/10; B25J 13/025
See application file for complete search history.

(56) References Cited

U.S. PATENT DOCUMENTS

| 9,816,537 B2 * | 11/2017 | Kim ...................... F15B 15/125 |
|---|---|---|
| 2013/0133513 A1 * | 5/2013 | Ito ........................... F01C 9/002 92/120 |
| 2015/0000515 A1 * | 1/2015 | Sobolewski ............ F15B 15/02 92/33 |

* cited by examiner

*Primary Examiner* — Abiy Teka
*Assistant Examiner* — Daniel S Collins
(74) *Attorney, Agent, or Firm* — Tai W. Nahm; Nahm IP Law (57) ABSTRACT

There is disclosed a rotary actuator apparatus for hydraulically or pneumatically rotating a robotic joint. In an embodiment the apparatus comprises: a curved piston rotatably coupled to an axel shaft, and positioned within a curved piston chamber; resilient barrier modules are adapted to separate the curved piston within the curved piston chamber from first and second hydraulic or pneumatic chambers on either side of the curved piston chamber; whereby, in use, the curved piston is configured to rotate about the axel shaft upon hydraulic or pneumatic pressure being applied to at least one of the first and second hydraulic or pneumatic chambers.

24 Claims, 7 Drawing Sheets

FIG. 7

HYBRID HYDROSTATIC ROTARY ACTUATOR APPARATUS

CROSS-REFERENCE TO RELATED APPLICATIONS

This application is a continuation of U.S. application Ser. No. 16/298,694 filed on Mar. 11, 2019, which claims the benefit of U.S. Provisional Application Ser. No. 62/641,213 filed on Mar. 9, 2018.

FIELD

The present disclosure relates generally to the field of robotic actuators, and more generally to actuators for rotary motion.

BACKGROUND

Hybrid hydrostatic "power-by-wire" actuators have been developed for performing various robotic applications, including robotic manipulation of objects requiring high dexterity, and more delicate tasks such as robotic interaction with humans.

Hybrid hydrostatic actuators greatly simplify actuation and control to provide fast response and greater reliability and efficiency. However, for certain applications requiring significant rotary motion, existing designs can be limited in dexterity, efficiency and performance.

Therefore, what is needed an improved apparatus for performing rotary motion more efficiently utilizing hybrid hydrostatic rotary actuators.

SUMMARY

The present disclosure describes what is believed to be a novel apparatus for performing rotary motion utilizing hybrid hydrostatic rotary actuators.

In an aspect, there is provided an apparatus comprising a curved piston and a rolling diaphragm which converts exerted hydraulic and or pneumatic pressure into a rotary motion. The low impedance design provides a cost effective haptic feedback which is a highly desirable for various robotic applications including interaction with humans.

In an embodiment, the apparatus provides a smooth, high-speed rotary motion utilizing a lightweight composite material which is highly responsive and efficient.

The apparatus is readily scalable, and may be formed by efficient manufacturing methods including 3D printing.

In another embodiment, the apparatus has a flexible design, and may comprise any combination of a hydraulic/pneumatic design, a dual hydraulic design, or a dual pneumatic design. The design may be active or passive.

Advantageously, by removing belts and pulleys and other mechanical parts that become unnecessary, the present apparatus provides an improved design for performing rotary motion utilizing hybrid hydrostatic rotary actuators with effective haptic feedback giving a person the ability to virtually touch and feel objects in a virtual world, or remotely touch and feel objects in the real world.

DETAILED DESCRIPTION

As noted above, the present disclosure relates generally to the field of robotic actuators, and more generally to hybrid hydrostatic actuators for rotary motion.

In an aspect, there is provided an apparatus comprising a curved piston with a rolling diaphragm which converts exerted hydraulic and or pneumatic pressure into a rotary motion of the piston. The low impedance design provides a cost effective haptic feedback which is a highly desirable for various robotic applications including interaction with humans.

In an embodiment, the apparatus provides a smooth, high-speed rotary motion utilizing a lightweight composite material which is highly responsive and efficient.

The apparatus is readily scalable, and may be formed by efficient manufacturing methods including 3D printing.

In another embodiment, the apparatus has a flexible design, and may comprise any combination of a hydraulic/pneumatic design, a dual hydraulic design, or a dual pneumatic design. The design may be "active" or "passive". Here, "active" refers to a system that requires sensors connected to a computer to translate the hydraulic/pneumatic actions into electrical signals so that it can be transmitted over wires or wirelessly to a receiving station where the electrical signals are translated back to hydraulic/pneumatic actions. Also, "passive" refers to a system that is closed looped where the transmitting hydraulic/pneumatic are directly connected to the receiving hydraulic/pneumatic using mechanical transmission lines such as hoses, tubes or pipes. Any actions on one side directly causes an equal and opposite reaction on the other side.

Before explaining at least one embodiment in detail, it is to be understood that the invention is not limited in its application to the details of construction and to the arrangements of the components set forth in the following description or the examples provided therein, or illustrated in the drawings. Therefore, it will be appreciated that a number of variants and modifications can be made without departing from the scope of the invention as described herein. The invention is capable of other embodiments and of being practiced and carried out in various ways. Also, it is to be understood that the phraseology and terminology employed herein are for the purpose of description and should not be regarded as limiting.

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the embodiments described herein. However, it will be understood that the embodiments described herein may be practiced without these specific details. In other instances, well-known methods, procedures and components have not been described in detail, so as not to obscure the embodiments described herein. Furthermore, this description is not to be considered as limiting the scope of the embodiments described herein in any way, but rather as merely describing the implementation of the various embodiments described herein.

Figure 1A:
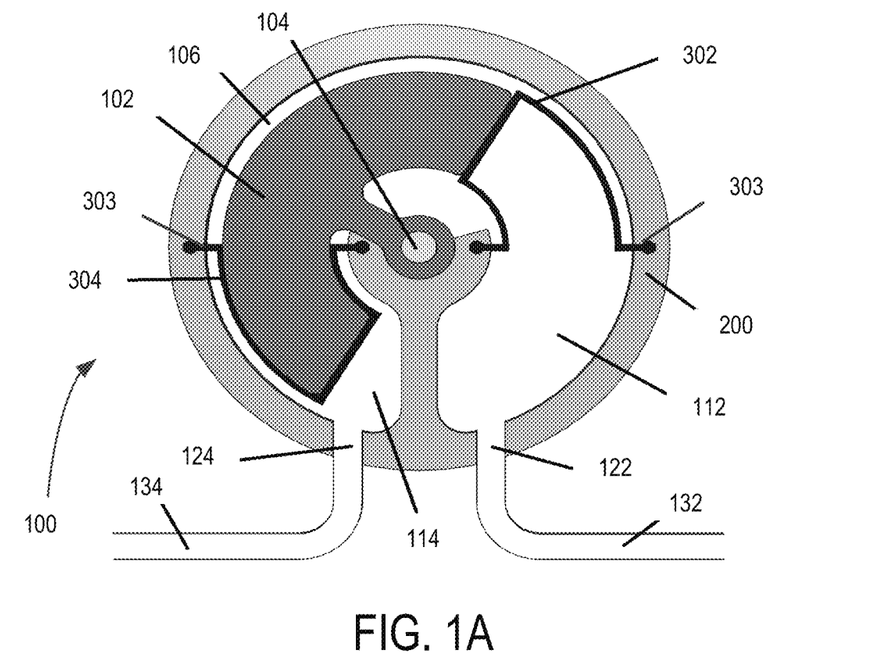
FIG. 1A shows a schematic cross-sectional view of an apparatus in accordance with an illustrative embodiment.

Now referring to FIG. 1A, shown is a schematic cross-sectional view of an apparatus 100 in accordance with an illustrative embodiment. As shown, the apparatus 100 includes a curved piston 102 which is rotatably connected to an axel shaft 104. In operation, the axel shaft 104 transmits the generated rotational force by the curved piston 102 to drive the system.

As shown in FIG. 1, rolling diaphragms 302, 304 create hydraulic/pneumatic barriers between first and second chambers 112, 114 and the curved piston chamber 106. The rolling diaphragms 302, 304 are adapted to allow the curved piston 102 to rotate back and forth within a range of rotational motion permitted by the size of the first/second chambers 112, 114 and the curved piston chamber 106.

Still referring to FIG. 1, a housing 200 provides mechanical protection for the first/second chambers 112, 114 and the curved piston chamber 106 from the outside world, and support for the moving components including the curved piston 102, and rolling diaphragms 302, 304.

An inlet/outlet 122, 124 is provided near the bottom of each of first/second chambers 112, 114, and are connected via a hose, tube or pipe to a hydraulic/pneumatic source or drive 132, 134.

Figure 1B:
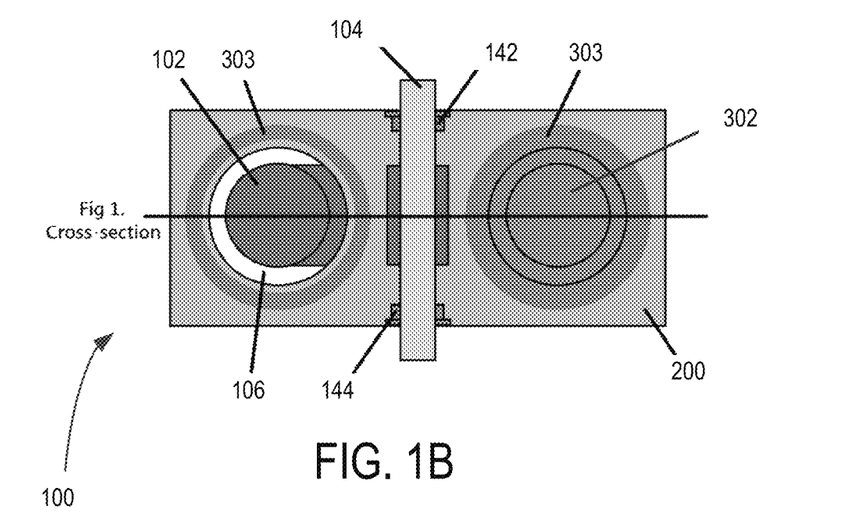
FIG. 1B shows a schematic cross-sectional view of the apparatus of FIG. 1A taken from the bottom of the apparatus.

FIG. 1B shows a schematic cross-sectional view of the apparatus of FIG. 1A taken from the bottom of the apparatus. In this view, bearings 142, 144 are shown which constrain the relative motion of the curved piston 102 to rotary motion within the curved piston chamber 106, and reduces the friction between the axel shaft 104 and the curved piston 102.

Figure 2A:
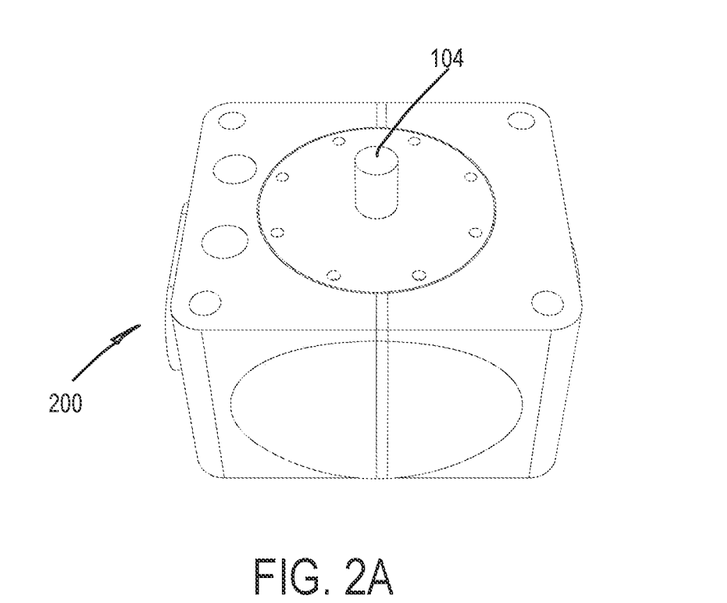
FIGS. 2A and 2B show perspective views of a housing enclosing the apparatus of FIGS. 1A and 1B.
Figure 2B:
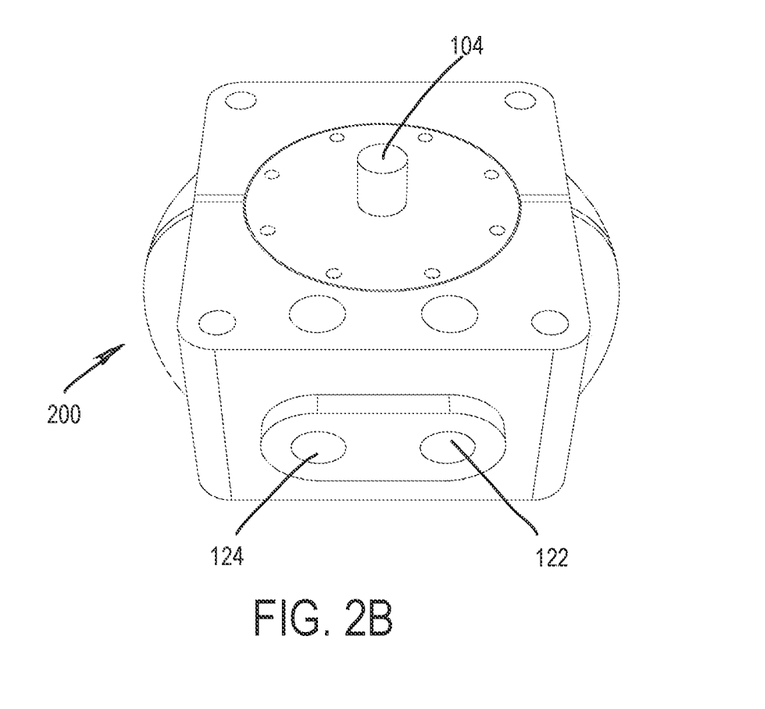

FIGS. 2A and 2B show perspective views of a housing 200 enclosing the apparatus 100 of FIGS. 1A and 1B. This housing 200 includes mounting locations to mount a first robotic limb on one of the sides, and to couple to a second robotic limb via axle shaft 104, thus acting as an elbow joint, knee joint, or a hip joint, for example.

Figure 3A:
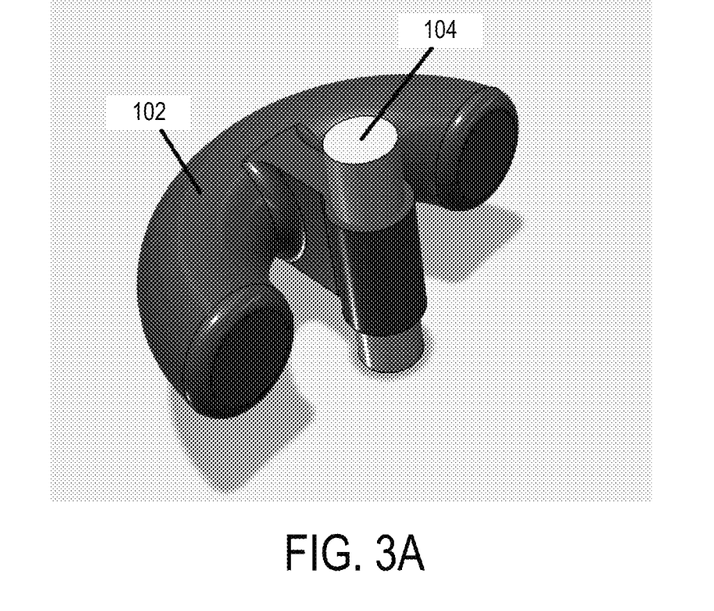
FIG. 3A shows a perspective view of a curved tubular piston in accordance with an illustrative embodiment.

FIG. 3A shows a perspective view of the curved piston 102 and axel shaft 104 of FIGS. 1A and 1B in accordance with an illustrative embodiment. As shown, the curved piston is generally a curved tubular shape, similar to a curved semi-toroid or "sausage" shape.

Figure 3B:
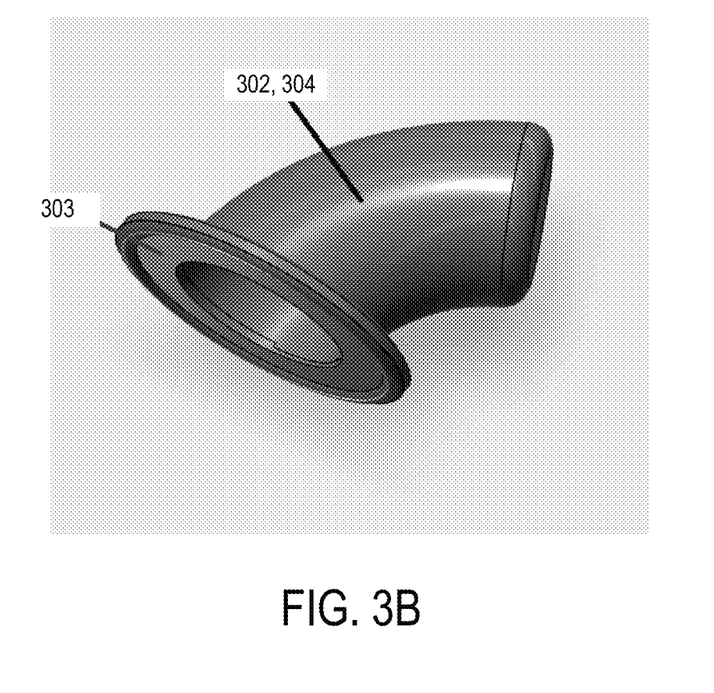
FIG. 3B shows a perspective view of a rolling diaphragm in accordance with an illustrative embodiment.

FIG. 3B shows a perspective view of a corresponding rolling diaphragm 302 or 304 which may serve as resilient movable hydraulic/pneumatic barrier modules in accordance with an illustrative embodiment. As shown in FIG. 1, the rolling diaphragm 302 or 304 is fitted over the curved piston 102 and anchored to a fixed position in order to create resilient movable barriers between chambers 112, 114 and 106 as earlier described.

Various types of materials may be used to construct the apparatus shown and described in FIGS. 1-3B. For example, the axle shaft 104 and bearings 142, 144 may be made from a suitably strong material, such as stainless steel, although other suitable materials may also be used. The housing 200 and curved piston 102 may be made from a lighter material, such as aluminum. Aluminum is cost effective and provides a suitable strength to weight ratio for the housing 200 and curved piston 102. However, the material is not limited to aluminum, and other suitable materials may be used. For the curved piston 102, additive manufacturing or 3D printing may be used to form its unique shape in a cost effective manner.

The rolling diaphragm 302, 304 must be a resilient material, and may be made from a suitably coated fabric material, for example. Alternative materials such as plastics and light weight composites may also be used. The limitations of the materials used to construct the rolling diaphragm 302, 304 may be limited by the range within which the material may be safely pressurized. The rolling diaphragm 302, 304 tested in the prototype had an upper pressure limit of 250-300 psi, but it will be appreciated that higher pressures may be achieved with suitable materials.

Figure 4:
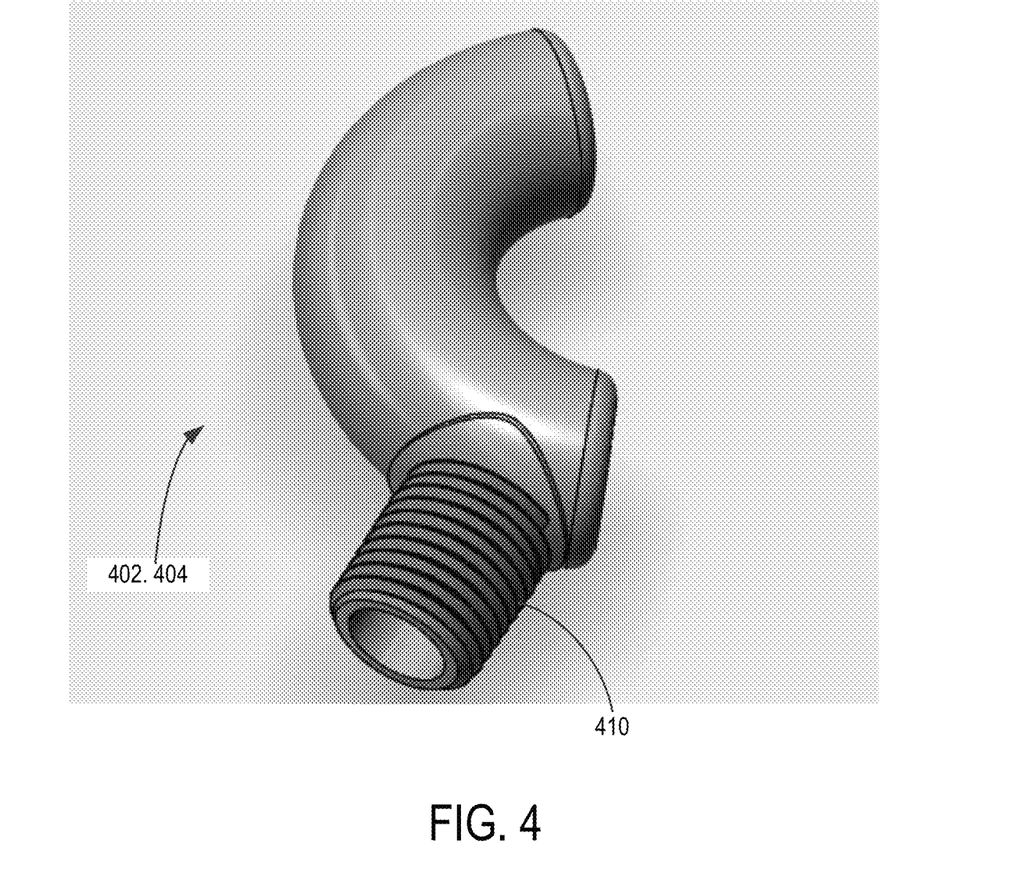
FIG. 4 shows a perspective view of another curved inflatable tubular member in accordance with an illustrative embodiment.

Now referring to FIG. 4, shown is a perspective view of a curved inflatable tubular member 402, 404 that may be substituted as a resilient barrier module for the pair for the rolling diaphragms 302, 304 illustrated in FIG. 3B and in FIG. 1. As shown, in this illustrative example, the curved inflatable tubular member 402, 404 may include a fill valve stem 410 for controlling the amount of compressible gas or fluid placed into, or taken out of the curved inflatable tubular member 402, 404. The curved inflatable tubular member 402 has an increased pressure limit of up to 1000 psi, but it will be appreciated that higher pressures may be achieved with other suitable materials.

In an embodiment, the curved inflatable tubular member 402 is adapted to fold into itself, similar to the design of the rolling diaphragms 302, 304. Therefore, the curved inflatable tubular member 402 must also be made of a resilient material which can be expanded and collapsed as the curved piston 102 rotates back and forth.

In an embodiment, the fill valve stem 410 may remain open to allow a gas or a liquid to be placed into or taken out of the curved inflatable tubular member 402, 404 by controlling a hydraulic or pneumatic source pump. Leaving the fill valve stem 410 open on both sides will provide the most amount of control to achieve a desired pressure within each chamber 112, 114.

In another embodiment, once filled with a suitable amount of compressible gas to achieve a desired pneumatic pressure, the curved inflatable tubular member 402, 404 may be closed, for example with a valve cap, to create a closed pneumatic chamber. This closed pneumatic chamber may be suitable for use in certain types of joints, where movement is limited in one direction (e.g. an elbow joint) and a closed pneumatic chamber provides a shock absorbing resistance against pressure form an opposing pneumatic chamber or hydraulic chamber to limit rotation of the curved piston 102.

Alternatively, the curved inflatable tubular member 402, 404 may be controlled by a pneumatic pump so that the amount of compressible air within the curved inflatable tubular member 402, 404 may be controlled.

Figure 5A:
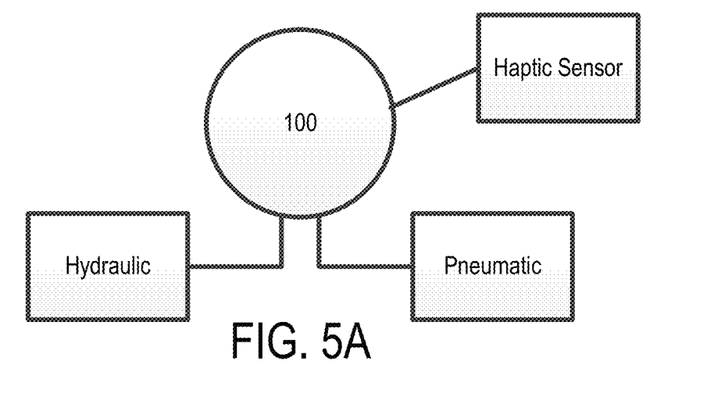
FIGS. 5A to 5C show schematic block diagrams of possible configurations.
Figure 5B:
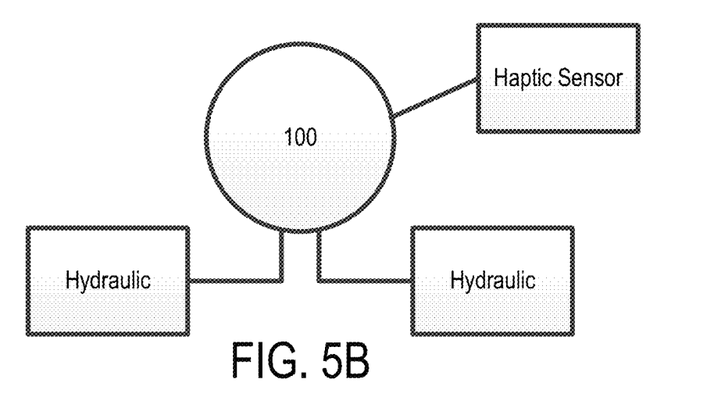
Figure 5C:
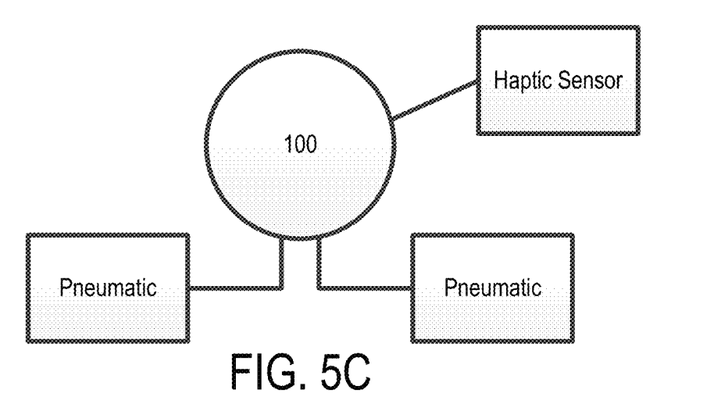
Figure 7:
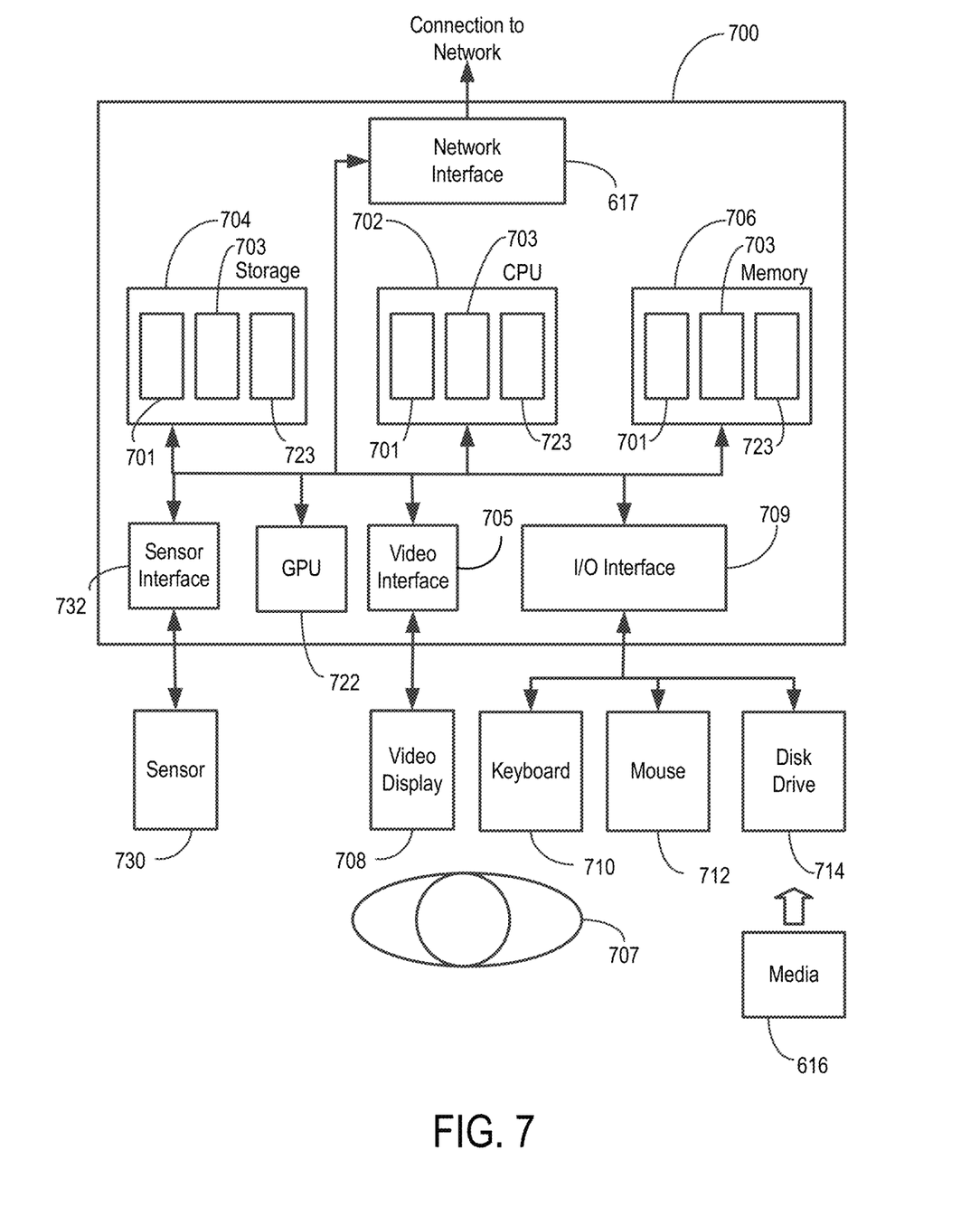
FIG. 7 shows a schematic block diagram of a generic computing device which may provide a processing platform for controlling the apparatus of FIGS. 1 to 5.

Now referring to FIG. 5A to 5C, shown are various illustrative examples of possible hydraulic/pneumatic combinations between the first and second chambers 112, 114, as earlier described. In each embodiment, a haptic sensor may be situated to collect haptic feedback data to transmit to a control module, such as a computing device 700 (FIG. 7). The haptic sensor may be one of any number of sensors, such as a rotary encoder for sensing the relative rotation of curved piston 102 (and therefore any limb attached to the apparatus). The haptic sensor may also be a Hall Effect sensor to detect or measure the magnitude of a magnetic field proportional to an effect on the rotary actuator apparatus. Any other type of sensor, such as a pressure sensor to sense pressure in each of the chambers may also be used to provide haptic feedback data that may be used to directly calculate or to extrapolate relative forces exerted by a limb attached to the rotary actuator apparatus.

FIG. 5A shows one side having a hydraulic source with a pump controlling the hydraulic pressure into one chamber, and a pneumatic source with a pump controlling the pneumatic pressure into an opposing chamber. A control module, enabled for example by a computing device 700 (FIG. 7) may control the pressures in both chambers to control the position of the curved piston 102.

Alternatively, in another embodiment, the pneumatic side may be closed once it is filled with compressible gas to a desired pneumatic pressure. A control module, such as a computing device 700, may control the amount of hydraulic pressure in a first chamber to counteract a fixed amount of pneumatic pressure in an opposing second chamber in order to control the position of curved piston 102.

FIG. 5B shows both sides having a hydraulic source with a pump controlling the hydraulic pressure into each of the chambers. A control module, enabled for example by a computing device 700 (FIG. 7) may control the hydraulic pressures in both chambers to control the position of the curved piston 102. This configuration may be used, for example, when greater rotational forces may be exerted in both directions.

FIG. 5C shows both sides having a pneumatic source with a source pump on each side controlling pneumatic pressures on both sides. A control module, enabled for example by a computing device 700 (FIG. 7) may control the pneumatic pressures in both chambers to control the position of the curved piston 102.

Alternatively, in another embodiment, one of the pneumatic sides may be closed once it is filled with compressible gas to a desired pneumatic pressure. A control module, such as a computing device 700, may control the amount of pneumatic pressure in a first chamber to counteract a fixed amount of pneumatic pressure in an opposing second chamber in order to control the position of curved piston 102.

Figure 6:
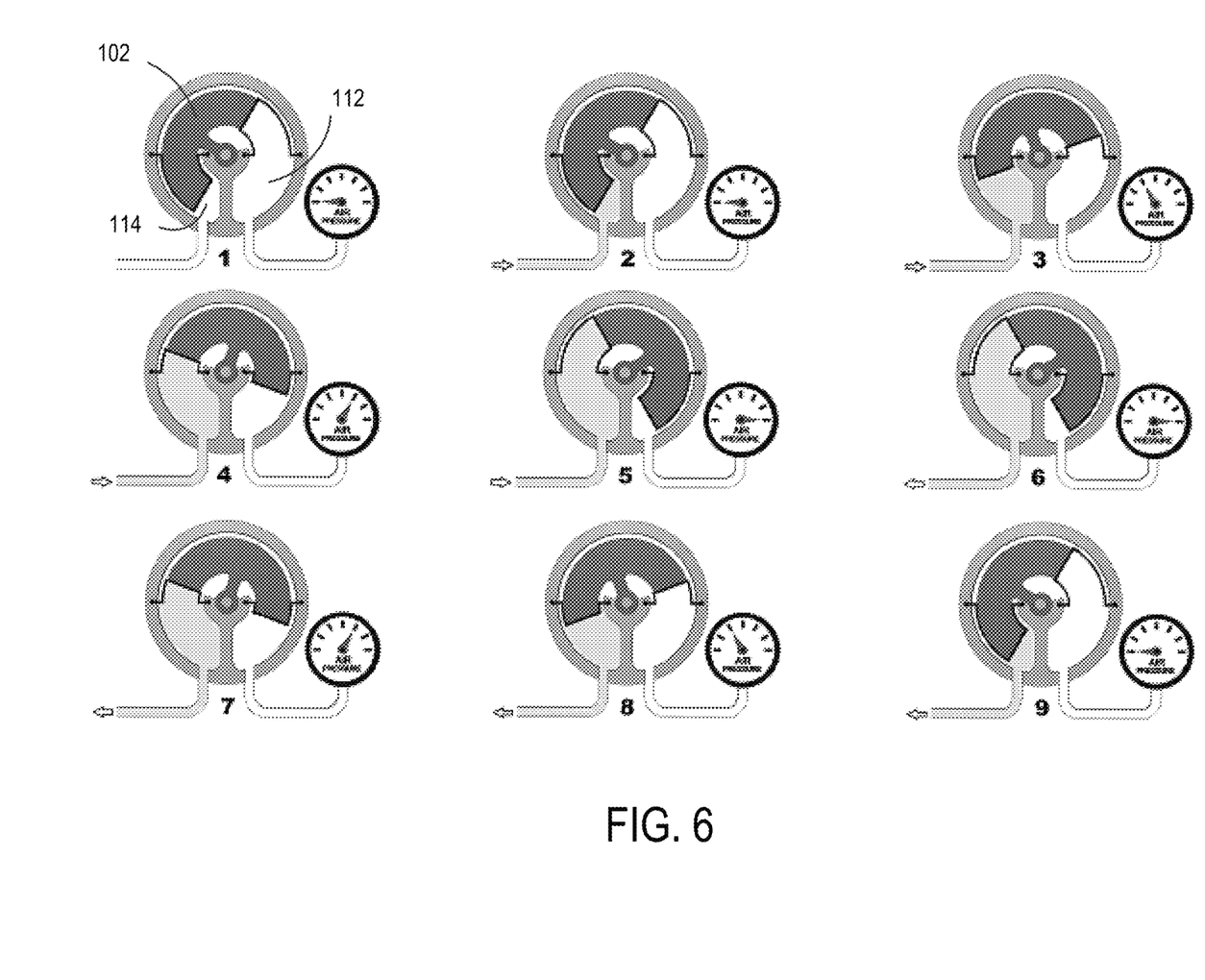
FIG. 6 shows a series of drawings indicating how the curved piston may be rotated by applying or removing hydraulic or pneumatic pressure to or from one side of a chamber.

Now referring to FIG. 6, shown is a series of drawings labeled (1) through (9) indicating how the curved piston 102 may be rotated within curved piston chamber 106 by applying or removing hydraulic or pneumatic pressure to or from one side of a chamber 112, 114 to another 114, 112. In this illustrative example, the left chamber corresponds to a hydraulic chamber 114, and the right chamber corresponds to a pneumatic chamber 112.

Starting from the top left, as shown, curved piston 102 is at an initial position towards its left most position in chamber 106. As hydraulic pressure is applied to the chamber hydraulic chamber 114, the curved piston 102 begins to rotate clockwise towards the right, even as the pneumatic pressure in pneumatic chamber 112 increases. At peak pressure, shown in the second row, right, the curved piston 102 is now shown towards its right most position in chamber 106, and a pressure gauge shows that the pneumatic pressure within the pneumatic chamber is also at its peak position with the needle to its right most position. As hydraulic pressure is removed from chamber 114, the curved piston 102 retreats and rotates back towards the left due to the pneumatic pressure in the pneumatic chamber 112, to return to its original left most position.

As will be appreciated, the pressure in chamber 114 may be controlled to counteract the rotation of curved piston 102, and thus may be used to control the speed of rotation, and help achieve the desired rotation of curved piston 102.

Now referring to FIG. 7, shown is a schematic block diagram of a generic computing device which may provide a processing platform for controlling the apparatus of FIGS. 1 to 6. By way of example, FIG. 7 shows a generic computer device 700 that may include a central processing unit ("CPU") 702 connected to a storage unit 704 and to a random access memory 706. The CPU 702 may process an operating system 701, application program 703, and data 723. The operating system 701, application program 703, and data 723 may be stored in storage unit 704 and loaded into memory 706, as may be required. Computer device 700 may further include a graphics processing unit (GPU) 722 which is operatively connected to CPU 702 and to memory 706 to offload intensive image processing calculations from CPU 702 and run these calculations in parallel with CPU 702. An operator 710 may interact with the computer device 700 using a video display 708 connected by a video interface 705, and various input/output devices such as a keyboard 710, pointer 712, and storage 714 connected by an I/O interface 709. In known manner, the pointer 712 may be configured to control movement of a cursor or pointer icon in the video display 708, and to operate various graphical user interface (GUI) controls appearing in the video display 708. The computer device 700 may form part of a network via a network interface 711, allowing the computer device 700 to communicate with other suitably configured data processing systems or circuits. One or more different types of sensors 730 connected via a sensor interface 732 may be used to search for and sense input from various sources.

As will be appreciated, the generic computing device 700 of FIG. 7 may be programmed to control the hydraulic/pneumatic source or drive 132, 134 and determine how much pressure is applied in one or both chambers 112 and 114. Thus, the rotational position of curved piston 102 may be controlled in this manner. Generic computing device 700 may also be adapted to receive a user input to control the amount of pressure applied to the apparatus, and also to provide haptic feedback via haptic sensors 730 connected to the apparatus 100 at various locations, to sense feedback signals as the curved piston 102 is rotated.

In an embodiment, the haptic feedback may be provided by one or more haptic sensors provided on the apparatus, as previously described. Alternatively, or in addition, the haptic feedback may be provided by monitoring the pressures, and the relative rotation of the curved piston.

In this manner, the apparatus may be utilized for any number of applications, including haptic feedback supported by avatar robotics, operating room telemedicine, and human-safe exoskeleton and prosthetics. Use of the apparatus may also be extended to smart manufacturing, collaborative robotics (i.e. robots that work alongside and physically interact with humans), and use of robotics in various industries including construction, mining, aerospace, and automotive.

Thus, in an aspect, there is provided a rotary actuator apparatus, comprising: a curved piston rotatably coupled to an axel shaft, and positioned within a curved piston chamber; and resilient barrier modules adapted to separate the curved piston within the curved piston chamber from first and second chambers on either side of the curved piston chamber; whereby, in use, the curved piston is configured to rotate about the axel shaft upon pressure being applied to at least one of the first and second chambers.

In an embodiment, one of the first and second chambers is a hydraulic chamber adapted to receive a hydraulic fluid, and another of the first and second chambers is a pneumatic chamber adapted to receive a compressible gas.

In another embodiment, the hydraulic chamber is coupled to a hydraulic pump adapted to generate hydraulic pressure within the hydraulic chamber in response to a first control signal.

In another embodiment, the hydraulic chamber is coupled to a hydraulic pump adapted to relieve hydraulic pressure within the hydraulic chamber in response to a second control signal.

In another embodiment, the pneumatic chamber is coupled to a pneumatic pump adapted to control the amount of compressible gas within the pneumatic chamber in order to control the pneumatic pressure within the pneumatic chamber.

In another embodiment, the pneumatic chamber is coupled to a pneumatic pump adapted to adjust the amount of compressible gas within the pneumatic chamber in order to adjust the pneumatic pressure within the pneumatic chamber in response to an opposing hydraulic pressure applied within the hydraulic chamber.

In another embodiment, the pneumatic chamber comprises a fill valve for filling the pneumatic chamber with a compressible gas to a desired pneumatic pressure.

In another embodiment, the fill valve includes a release pin for releasing compressible gas from the pneumatic chamber.

In another embodiment, the apparatus further comprises one or more haptic sensors adapted to provide haptic feedback based on respective hydraulic and pneumatic pressures within each of the hydraulic and pneumatic chambers.

In another embodiment, the apparatus further comprises one or more haptic sensors adapted to provide haptic feedback based on rotation of the curved piston.

In another embodiment, both the first and second chambers are hydraulic chambers, each of the first and second hydraulic chambers adapted to receive a hydraulic fluid.

In another embodiment, each of the first and second hydraulic chambers are coupled to first and second hydraulic pumps, respectively, the first and second hydraulic pumps adapted to generate or to relieve hydraulic pressure to rotate the curved piston in a first direction in response to a first control signal.

In another embodiment, each of the first and second hydraulic pumps are adapted to relieve or generate hydraulic pressure to rotate the curved piston in an opposite second direction in response to a second control signal.

In another embodiment, the hydraulic pumps are adapted to be controlled to adjust the rate of change of hydraulic pressures within the first and second hydraulic chambers to control the speed of rotation of the curved piston.

In another embodiment, the apparatus further comprises one or more haptic sensors adapted to provide haptic feedback based on respective hydraulic pressures within the hydraulic chambers.

In another embodiment, both the first and second chambers are pneumatic chambers, each of the first and second pneumatic chambers adapted to receive a compressible gas.

In another embodiment, each of the first and second pneumatic chambers are coupled to first and second pneumatic pumps, respectively, the first and second pneumatic pumps adapted to control the amount of compressible gas within the first and second pneumatic chambers to rotate the curved piston in a first direction in response to a first control signal, and a second direction in response to a second control signal.

In another embodiment, one of the first and second pneumatic chambers is coupled to a pneumatic pump, and the other of the first and second pneumatic chambers comprises a closed pneumatic chamber with a fill valve for filling the closed pneumatic chamber with compressible gas to a desired pneumatic pressure.

In another embodiment, the apparatus further comprises one or more haptic sensors adapted to provide haptic feedback based on respective pneumatic pressures within the pneumatic chambers.

In another aspect, there is provided a rotary actuator system with haptic feedback, comprising: a rotary actuator apparatus having: a curved piston rotatably coupled to an axel shaft, and positioned within a curved piston chamber; resilient barrier modules adapted to separate the curved piston within the curved piston chamber from first and second chambers on either side of the curved piston chamber; and one or more haptic sensors situated to collect and transmit haptic feedback data based on one or more of the rotation of the curved piston and the respective pressures in each of the first and second chambers; and a control module adapted to receive the haptic feedback data transmitted by the one or more haptic sensors to control the rotary actuator apparatus in response thereto.

In an embodiment, the one or more haptic sensors comprise a rotary encoder for sensing the relative rotation of the curved piston.

In another embodiment, the one or more haptic sensors comprise a Hall Effect sensor for detecting or measuring the magnitude of a magnetic force proportional to an effect on the rotary actuator apparatus.

In another embodiment, the one or more haptic sensors comprise a pressure sensor for sensing the respective pressures in each of the first and second chambers.

In another embodiment, the control module is adapted to control the respective pressures in each of the first and second chambers in response to the haptic feedback data.

In another embodiment, the control module is adapted to control the relative position of the rotary piston in response to a user input.

In another embodiment, the control module is adapted to control the amount of pressure applied by the user input in response to the haptic feedback data.

In another embodiment, the control module is adapted to remotely provide a user controlling the user input with direct haptic feedback.

In another embodiment, the system is adapted for use with avatar robotics, operating room telemedicine, human-safe exoskeleton and prosthetics.

In another embodiment, the system is adapted for use with smart manufacturing and collaborative robotics.

While illustrative embodiments have been described above by way of example, it will be appreciated that various changes and modifications may be made without departing from the scope of the system and method, which is defined by the following claims.

The invention claimed is:

1. A rotary actuator system with haptic feedback, comprising:
   a rotary actuator apparatus having:
      a curved piston rotatably coupled to an axel shaft, and positioned within a curved piston chamber;
      resilient barrier modules adapted to separate the curved piston within the curved piston chamber from first and second chambers on either side of the curved piston chamber; and one or more haptic sensors situated to collect and transmit haptic feedback data based on one or more of the rotation of the curved piston and the respective pressures in each of the first and second chambers; and a control module adapted to receive the haptic feedback data transmitted by the one or more haptic sensors to control the rotary actuator apparatus in response thereto.

2. The system of claim 1, wherein the one or more haptic sensors comprise a rotary encoder for sensing the relative rotation of the curved piston.

3. The system of claim 1, wherein the one or more haptic sensors comprise a Hall Effect sensor for detecting or measuring the magnitude of a magnetic force proportional to an effect on the rotary actuator apparatus.

4. The system of claim 1, wherein the one or more haptic sensors comprise a pressure sensor for sensing the respective pressures in each of the first and second chambers.

5. The system of claim 1, wherein the control module is adapted to control the respective pressures in each of the first and second chambers in response to the haptic feedback data.

6. The system of claim 5, wherein the control module is adapted to control the relative position of the rotary piston in response to a user input.

7. The system of claim 6, wherein the control module is adapted to control the amount of pressure applied by the user input in response to the haptic feedback data.

8. The system of claim 7, wherein the control module is adapted to remotely provide a user controlling the user input with direct haptic feedback.

9. The system of claim 8, wherein the system is adapted for use with avatar robotics, operating room telemedicine, human-safe exoskeleton and prosthetics.

10. The system of claim 8, wherein the system is adapted for use with smart manufacturing and collaborative robotics.

11. The system of claim 1, wherein one of the first and second chambers is a hydraulic chamber adapted to receive a hydraulic fluid, and another of the first and second chambers is a pneumatic chamber adapted to receive a compressible gas.

12. The system of claim 11, wherein the hydraulic chamber is coupled to a hydraulic pump adapted to generate hydraulic pressure within the hydraulic chamber in response to a first control signal.

13. The system of claim 11, wherein the hydraulic chamber is coupled to a hydraulic pump adapted to relieve hydraulic pressure within the hydraulic chamber in response to a second control signal.

14. The system of claim 11, wherein the pneumatic chamber is coupled to a pneumatic pump adapted to control the amount of compressible gas within the pneumatic chamber in order to control the pneumatic pressure within the pneumatic chamber.

15. The system of claim 11, wherein the pneumatic chamber is coupled to a pneumatic pump adapted to adjust the amount of compressible gas within the pneumatic chamber in order to adjust the pneumatic pressure within the pneumatic chamber in response to an opposing hydraulic pressure applied within the hydraulic chamber.

16. The system of claim 11, wherein the pneumatic chamber comprises a fill valve for filling the pneumatic chamber with a compressible gas to a desired pneumatic pressure.

17. The system of claim 16, wherein the fill valve includes a release pin for releasing compressible gas from the pneumatic chamber.

18. The system of claim 1, wherein both the first and second chambers are hydraulic chambers, each of the first and second hydraulic chambers adapted to receive a hydraulic fluid.

19. The system of claim 18, wherein each of the first and second hydraulic chambers are coupled to first and second hydraulic pumps, respectively, the first and second hydraulic pumps adapted to generate or to relieve hydraulic pressure to rotate the curved piston in a first direction in response to a first control signal.

20. The system of claim 19, wherein each of the first and second hydraulic pumps are adapted to relieve or generate hydraulic pressure to rotate the curved piston in an opposite second direction in response to a second control signal.

21. The system of claim 20, wherein the hydraulic pumps are adapted to be controlled to adjust the rate of change of hydraulic pressures within the first and second hydraulic chambers to control the speed of rotation of the curved piston.

22. The system of claim 1, wherein both the first and second chambers are pneumatic chambers, each of the first and second pneumatic chambers adapted to receive a compressible gas.

23. The system of claim 22, wherein each of the first and second pneumatic chambers are coupled to first and second pneumatic pumps, respectively, the first and second pneumatic pumps adapted to control the amount of compressible gas within the first and second pneumatic chambers to rotate the curved piston in a first direction in response to a first control signal, and a second direction in response to a second control signal.

24. The system of claim 23, wherein one of the first and second pneumatic chambers is coupled to a pneumatic pump, and the other of the first and second pneumatic chambers comprises a closed pneumatic chamber with a fill valve for filling the closed pneumatic chamber with compressible gas to a desired pneumatic pressure.

* * * * *